United States Patent [19]

De Caro

[11] Patent Number: 5,718,499
[45] Date of Patent: Feb. 17, 1998

[54] ROLLER BLADE WHEEL LIGHTING SYSTEM

[76] Inventor: Frank De Caro, 2 Marina Ave., Brooklyn, N.Y. 11209

[21] Appl. No.: 679,810

[22] Filed: Jul. 15, 1996

[51] Int. Cl.⁶ .................................................. A63C 17/26
[52] U.S. Cl. .......................... 362/78; 362/192; 362/234; 280/11.22; 301/5.3
[58] Field of Search ........................... 362/78, 103, 192, 362/234, 244, 249; 280/11.19, 11.22, 11.23, 809, 811; 301/5.3; 310/67 R, 67 A, 73

[56] References Cited

U.S. PATENT DOCUMENTS

| | | | |
|---|---|---|---|
| 4,775,919 | 10/1988 | Pearsall et al. | 362/78 |
| 5,456,478 | 10/1995 | Hsu et al. | 280/11.22 |
| 5,536,026 | 7/1996 | Pozzobon et al. | 280/11.22 |
| 5,580,092 | 12/1996 | Hsu et al. | 362/78 |
| 5,580,093 | 12/1996 | Conway | 362/78 |

Primary Examiner—Alan Cariaso

[57] ABSTRACT

A new Roller Blade Wheel Lighting System for increasing the visibility of the user when roller blading in darkness, without requiring an external power source. The inventive device includes a transparent cylindrical plastic rim rotatably secured to a conventional blade support member of a roller blade, an illuminating means positioned within the transparent cylindrical plastic rim, and a hard rubber rim secured around the transparent cylindrical plastic rim juxtaposed to the blading surface.

4 Claims, 3 Drawing Sheets

ROLLER BLADE WHEEL LIGHTING SYSTEM

BACKGROUND OF THE INVENTION

1. Field of the Invention

The present invention relates to Roller Blade Wheel Devices and more particularly pertains to a new Roller Blade Wheel Lighting System for increasing the visibility of the user when roller blading in darkness, without requiring an external power source.

2. Description of the Prior Art

The use of Roller Blade Wheel Devices is known in the prior art. More specifically, Roller Blade Wheel Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Roller Blade Wheel Devices include U.S. Pat. No. 4,298,910; U.S. Pat. No. 4,648,610; U.S. Pat. No. 5,294,188; U.S. Pat. No. 4,463,412; U.S. Pat. No. 4,336,573 and U.S. Pat. No. 4,363,502.

While these devices fulfill their respective, particular objectives and requirements, the aforementioned patents do not disclose a new Roller Blade Wheel Lighting System. The inventive device includes a transparent cylindrical plastic rim rotatably secured to a conventional blade support member of a roller blade, an illuminating means positioned within the transparent cylindrical plastic rim, and a hard rubber rim secured around the transparent cylindrical plastic rim juxtaposed to the blading surface.

In these respects, the Roller Blade Wheel Lighting System according to the present invention substantially departs from the conventional concepts and designs of the prior art, and in so doing provides an apparatus primarily developed for the purpose of increasing the visibility of the user when roller blading in darkness, without requiring an external power source.

SUMMARY OF THE INVENTION

In view of the foregoing disadvantages inherent in the known types of Roller Blade Wheel Devices now present in the prior art, the present invention provides a new Roller Blade Wheel Lighting System construction wherein the same can be utilized for increasing the visibility of the user when roller blading in darkness, without requiring an external power source.

The general purpose of the present invention, which will be described subsequently in greater detail, is to provide a new Roller Blade Wheel Lighting System apparatus and method which has many of the advantages of the Roller Blade Wheel Devices mentioned heretofore and many novel features that result in a new Roller Blade Wheel Lighting System which is not anticipated, rendered obvious, suggested, or even implied by any of the prior art Roller Blade Wheel Devices, either alone or in any combination thereof.

To attain this, the present invention generally comprises a transparent cylindrical plastic rim rotatably secured to a conventional blade support member of a roller blade, an illuminating means positioned within the transparent cylindrical plastic rim, and a hard rubber rim secured around the transparent cylindrical plastic rim juxtaposed to the blading surface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Roller Blade Wheel Lighting System apparatus and method which has many of the advantages of the Roller Blade Wheel Devices mentioned heretofore and many novel features that result in a new Roller Blade Wheel Lighting System which is not anticipated, rendered obvious, suggested, or even implied by any of the prior art Roller Blade Wheel Devices, either alone or in any combination thereof.

It is another object of the present invention to provide a new Roller Blade Wheel Lighting System which may be easily and efficiently manufactured and marketed.

It is a further object of the present invention to provide a new Roller Blade Wheel Lighting System which is of a durable and reliable construction.

An even further object of the present invention is to provide a new Roller Blade Wheel Lighting System which is susceptible of a low cost of manufacture with regard to both materials and labor, and which accordingly is then susceptible of low prices of sale to the consuming public, thereby making such Roller Blade Wheel Lighting System economically available to the buying public.

Still yet another object of the present invention is to provide a new Roller Blade Wheel Lighting System which provides in the apparatuses and methods of the prior art some of the advantages thereof, while simultaneously overcoming some of the disadvantages normally associated therewith.

Still another object of the present invention is to provide a new Roller Blade Wheel Lighting System for increasing the visibility of the user when roller blading in darkness, without requiring an external power source.

Yet another object of the present invention is to provide a new Roller Blade Wheel Lighting System which includes a transparent cylindrical plastic rim rotatably secured to a conventional blade support member of a roller blade, an illuminating means positioned within the transparent cylindrical plastic rim, and a hard rubber rim secured around the transparent cylindrical plastic rim juxtaposed to the blading surface.

Still yet another object of the present invention is to provide a new Roller Blade Wheel Lighting System that is self powered.

Even still another object of the present invention is to provide a new Roller Blade Wheel Lighting System that increases the skater's visibility to automobile drivers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
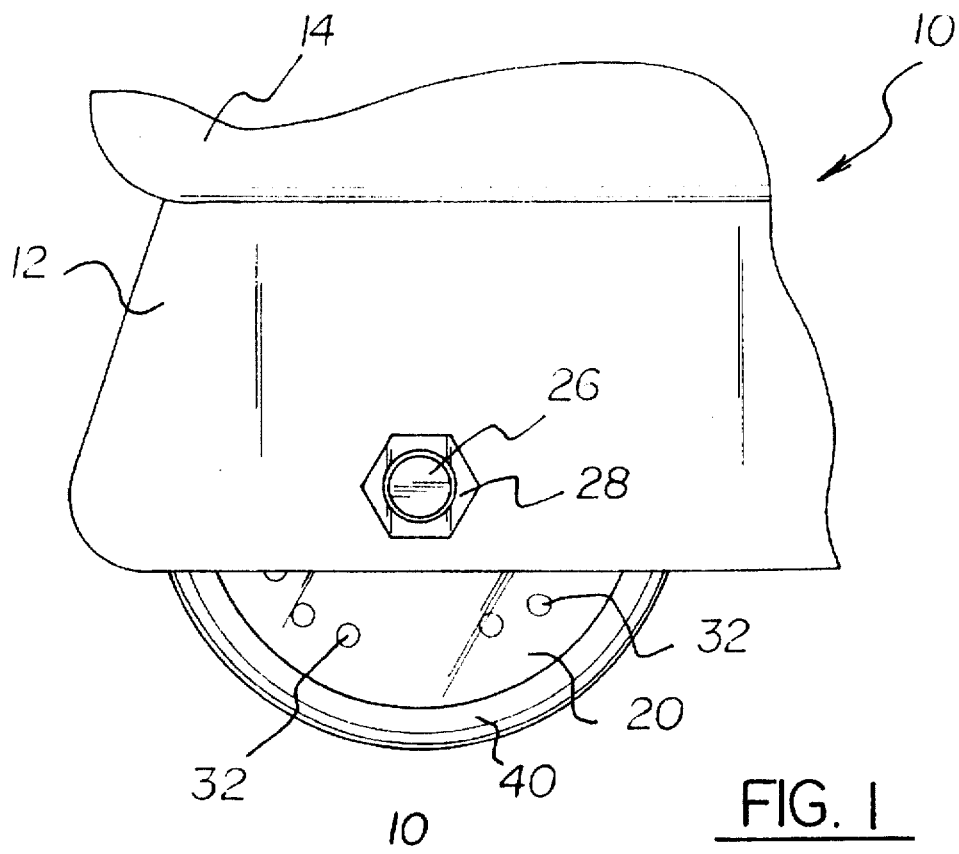
FIG. 1 is a side view of a new Roller Blade Wheel Lighting System rotatably secured to a blade support member according to the present invention.
Figure 2:
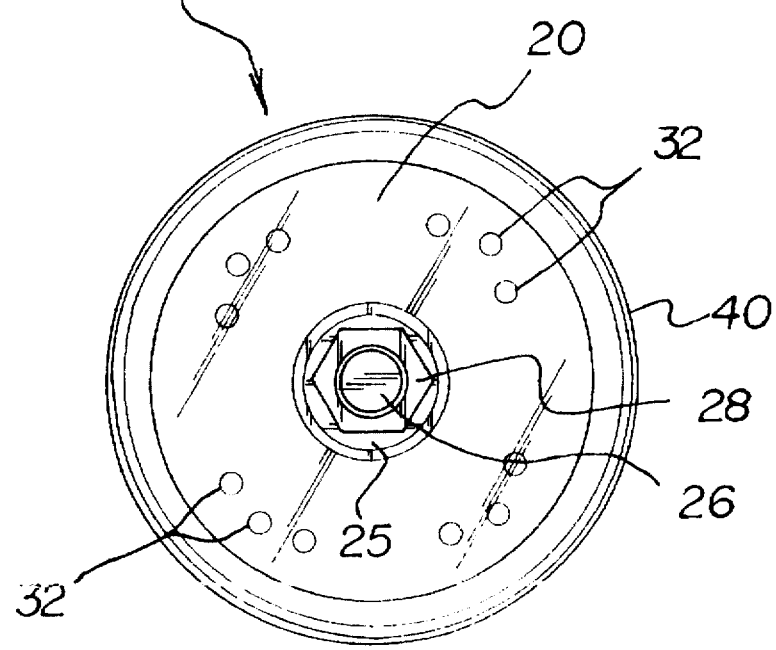
FIG. 2 is a side view thereof disclosing the hard rubber rim surrounding the transparent cylindrical plastic rim containing the illuminating means.
Figure 3:
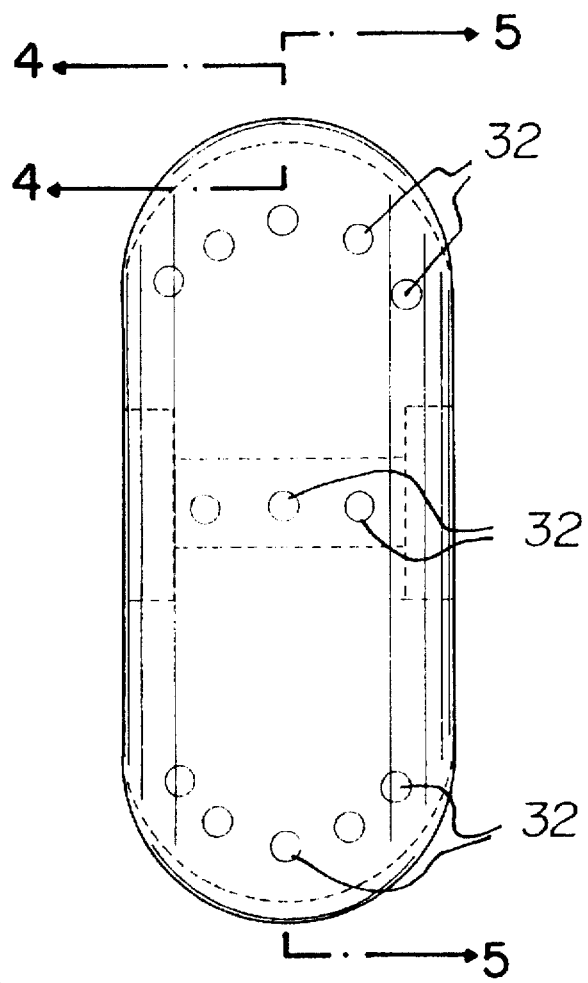
FIG. 3 is a front view of the present invention further disclosing the positioning of the LEDs within the transparent cylindrical plastic rim.
Figure 4:
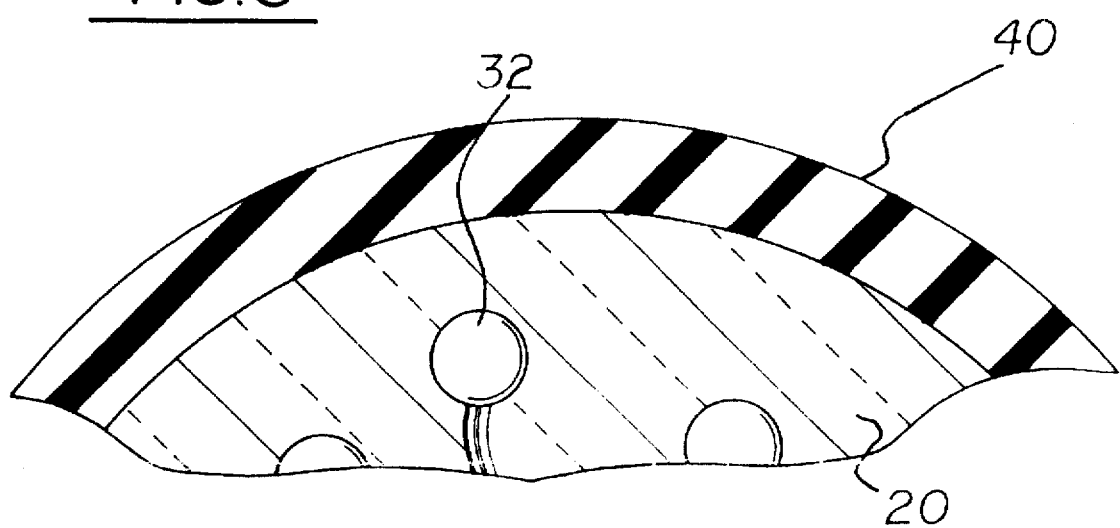
FIG. 4 is a cross sectional view take along line 4—4 of FIG. 3 disclosing the hard rubber rim surrounding the transparent cylindrical plastic rim.

With reference now to the drawings, and in particular to FIGS. 1 through 6 thereof, a new Roller Blade Wheel Lighting System embodying the principles and concepts of the present invention and generally designated by the reference numeral 10 will be described.

More specifically, it will be noted that the Roller Blade Wheel Lighting System 10 comprises a transparent cylindrical plastic rim 20, at least one illuminating means 30 secured within the transparent cylindrical plastic rim 20, and a hard rubber rim 40 surrounding the transparent cylindrical plastic rim 20 thereby engaging the skating surface.

Figure 5:
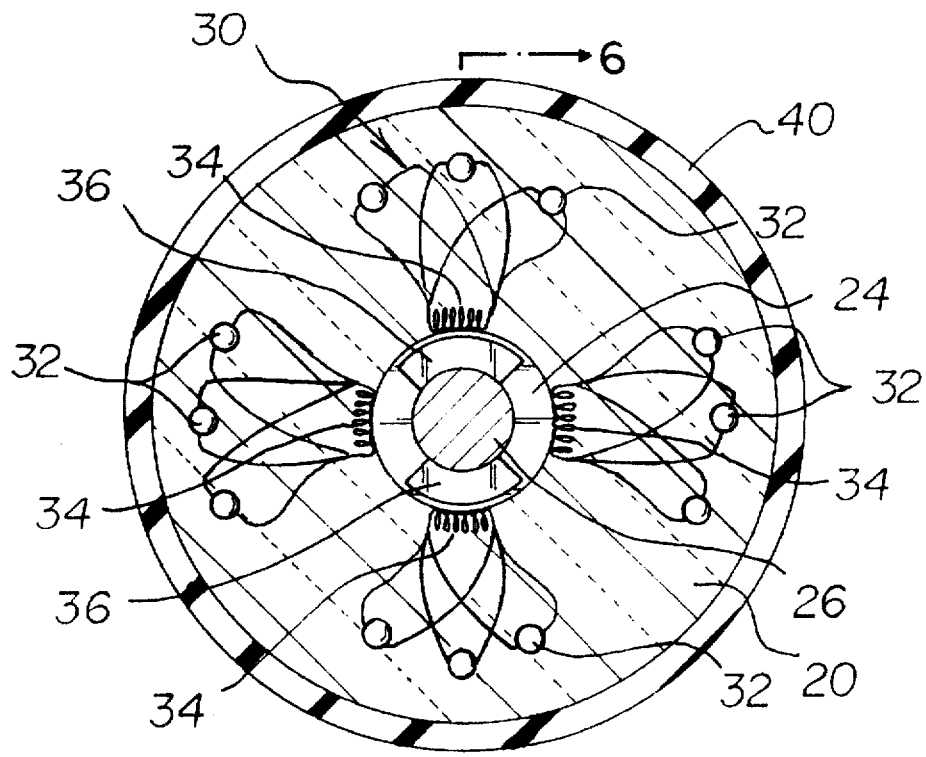
FIG. 5 is a cross sectional view taken along line 5—5 of FIG. 3 disclosing the LEDs electronically connected to the induction coil which is magnetically connected to the semi-circular magnet surrounding the axle shaft.
Figure 6:
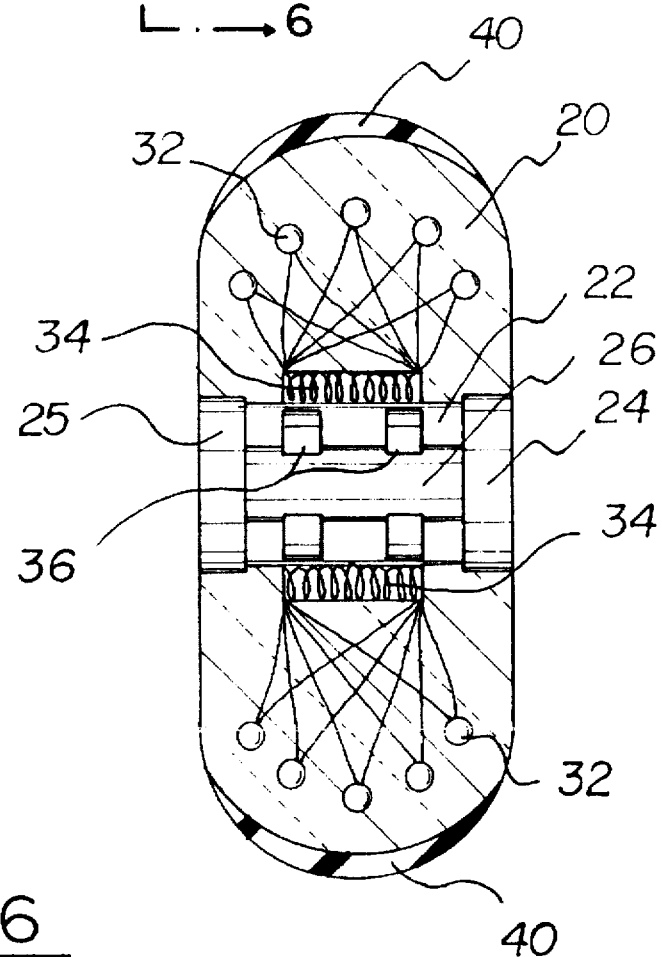
FIG. 6 is a cross sectional view taken along line 6—6 of FIG. 5 disclosing the semi-circular magnet in relation to the induction coil.

As best illustrated in FIGS. 1 through 6, it can be shown that the transparent cylindrical plastic rim 20 includes a rotating means passage 22 through the center receiving an axle shaft 26 which engages a blade support member 12 secured with a nut fastener 28. The transparent cylindrical plastic rim 20 rotates about the axle shaft 26 with a first bearing 24 at one end of the axle shaft 26 and a second bearing 25 at the end opposite of the first bearing 24 as best shown in FIG. 6 of the drawings. The illuminating means 30 includes at least one semi-circular magnet 36 secured around the interior portion of the axle shaft 26. At least one induction coil 34 is secured within the central portion of the transparent cylindrical plastic rim 20 positioned near the semi-circular magnet's 36 rotational path so as to induce an electrical current through the induction coil 34 upon passing the semi-circular magnet 36. At least one LED 32 is electronically connected to the induction coil 34 and positioned within the outer portion of the transparent cylindrical plastic rim 20 so as to illuminate the transparent cylindrical plastic rim 20. The illuminating means 30 preferable includes at least four induction coils 34 proportionally spaced around the rotating means passage 22 as best disclosed in FIG. 5 of the drawings. Preferable, two semi-circular magnets 36 are secured opposite of each other around the axle shaft 26 so as to induce an electrical current within the induction coils 34 upon passing by them as best shown in FIG. 5 of the drawings. Preferable, five LEDs 32 are electronically connected to each induction coil 34 in parallel as best disclosed in FIG. 6 of the drawings. The LEDs 32 are spaced so as to achieve maximum illumination of the transparent cylindrical plastic rim 20 as further disclosed in FIGS. 2 and 5 of the drawings.

In use, the user begins forward motion which thereby causes the transparent cylindrical plastic rim 20 to rotate about the axle shaft 26 which is connected to the blade support member 12. The induction coils 34 within the transparent cylindrical plastic rim 20 pass near the semi-circular magnets 35 which induces an electrical current within the induction coils 34. The electrical current flows through the LEDs 32 connected in parallel thereby illuminating the LEDs 32 which emanates light to drivers of vehicles, even if one LED 32 should become inactive. When the user terminates motion, there is no longer any rotation to produce the electrical current thereby terminating the light emanating from the LEDs 32.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. A inline skate wheel lighting system comprising:

a transparent cylindrical plastic wheel rim;

at least one illuminating means secured within the transparent cylindrical plastic wheel rim; and a hard rubber rim surrounding the transparent cylindrical plastic wheel rim for engaging a skating surface;

wherein the transparent cylindrical plastic wheel rim includes a rotating means passage through the center of said wheel rim, an axle shaft received in said rotating means passage and secured to a support member of an inline skate with a nut fastener, said transparent cylindrical plastic wheel rim being rotatable about the axle shaft, a first bearing being mounted at one end of the axle shaft and a second bearing being mounted at the end of said axle shaft opposite said first bearing;

wherein the illuminating means includes:

at least one semi-circular magnet mounted about the axle shaft;

at least one induction coil secured within the transparent cylindrical plastic wheel rim in a position near the semi-circular on the axle shaft for inducing an electrical current through the induction coil as the induction coil in the wheel rim rotates about the semi-circular magnet in the axle shaft; and at least two light emitting devices electronically connected to the induction coil and positioned within the transparent cylindrical plastic wheel rim, at least one of said light emitting devices being radially spaced from said axle shaft at a distance different from the distance another said light emitting device is radially spaced from said axle shaft to project a radially variable light pattern from the wheel when said wheel is rotated.

2. The inline skate wheel lighting system of claim 1, wherein the illuminating means comprises at least five light emitting devices, said light emitting devices being radially spaced from said axle shaft at at least three different distances from said axle shaft to project an undulating light movement when said wheel is rotated.

3. The inline skate wheel lighting system of claim 1 wherein the illuminating means includes:

at least four induction coils proportionally spaced around the rotating means passage of said wheel rim;

two semi-circular magnets secured in an opposed relationship on the axle shaft; and five light emitting devices electronically connected to each induction coil in parallel.

4. The inline skate wheel lighting system of claim 1 wherein the light emitting devices are positioned within said wheel rim so as to achieve maximum illumination of the transparent cylindrical plastic rim.

* * * * *